No. 842,830. PATENTED JAN. 29, 1907.
W. C. DUNN.
DEVICE FOR ADVERTISING EFFERVESCENT LIQUIDS.
APPLICATION FILED NOV. 3, 1905.
3 SHEETS—SHEET 1.
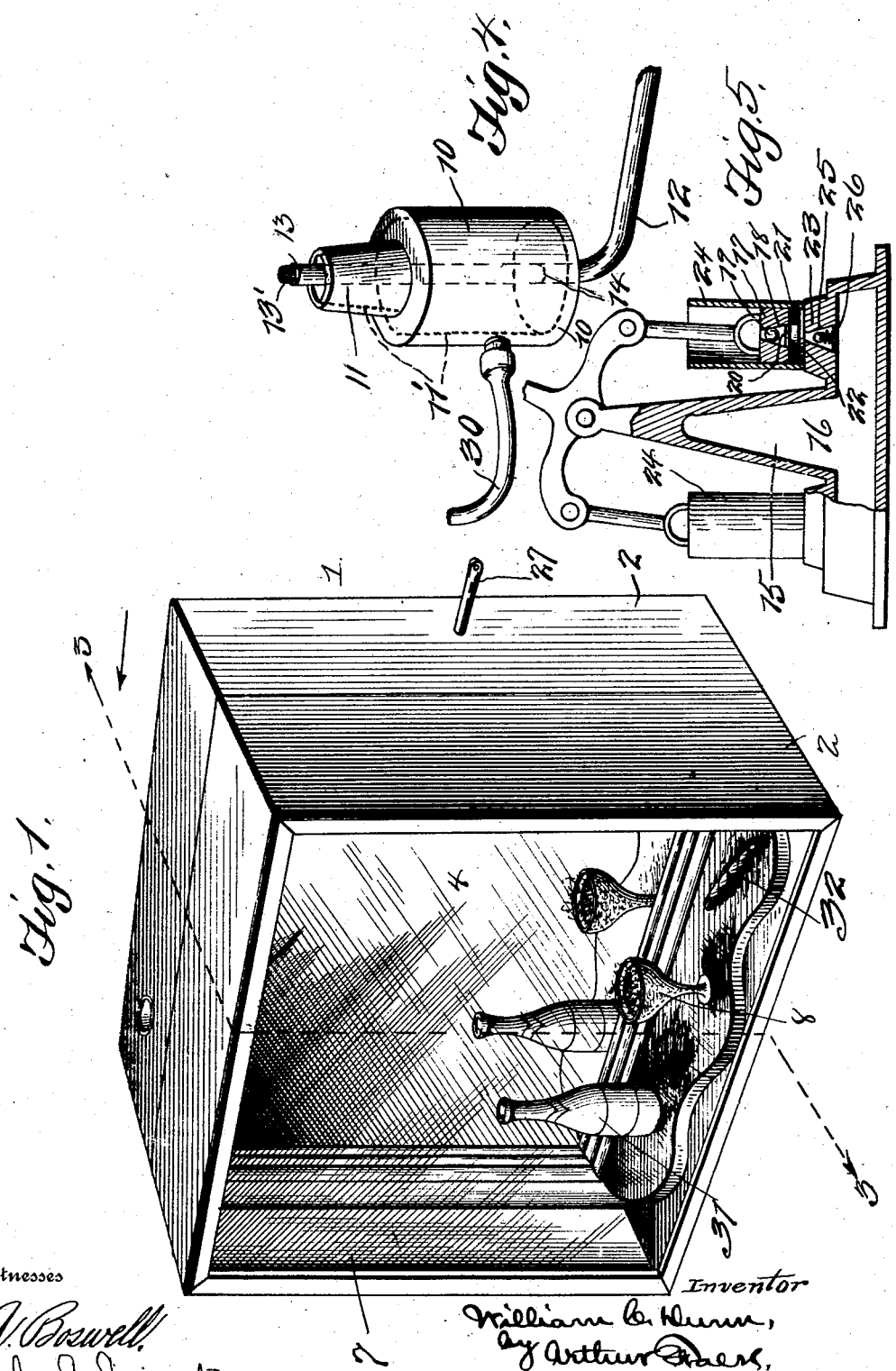
Witnesses
Inventor
William C. Dunn,
by Arthur Others,
Attorney No. 842,830. PATENTED JAN. 29, 1907.
W. C. DUNN.
DEVICE FOR ADVERTISING EFFERVESCENT LIQUIDS.
APPLICATION FILED NOV. 3, 1905.
3 SHEETS—SHEET 2.
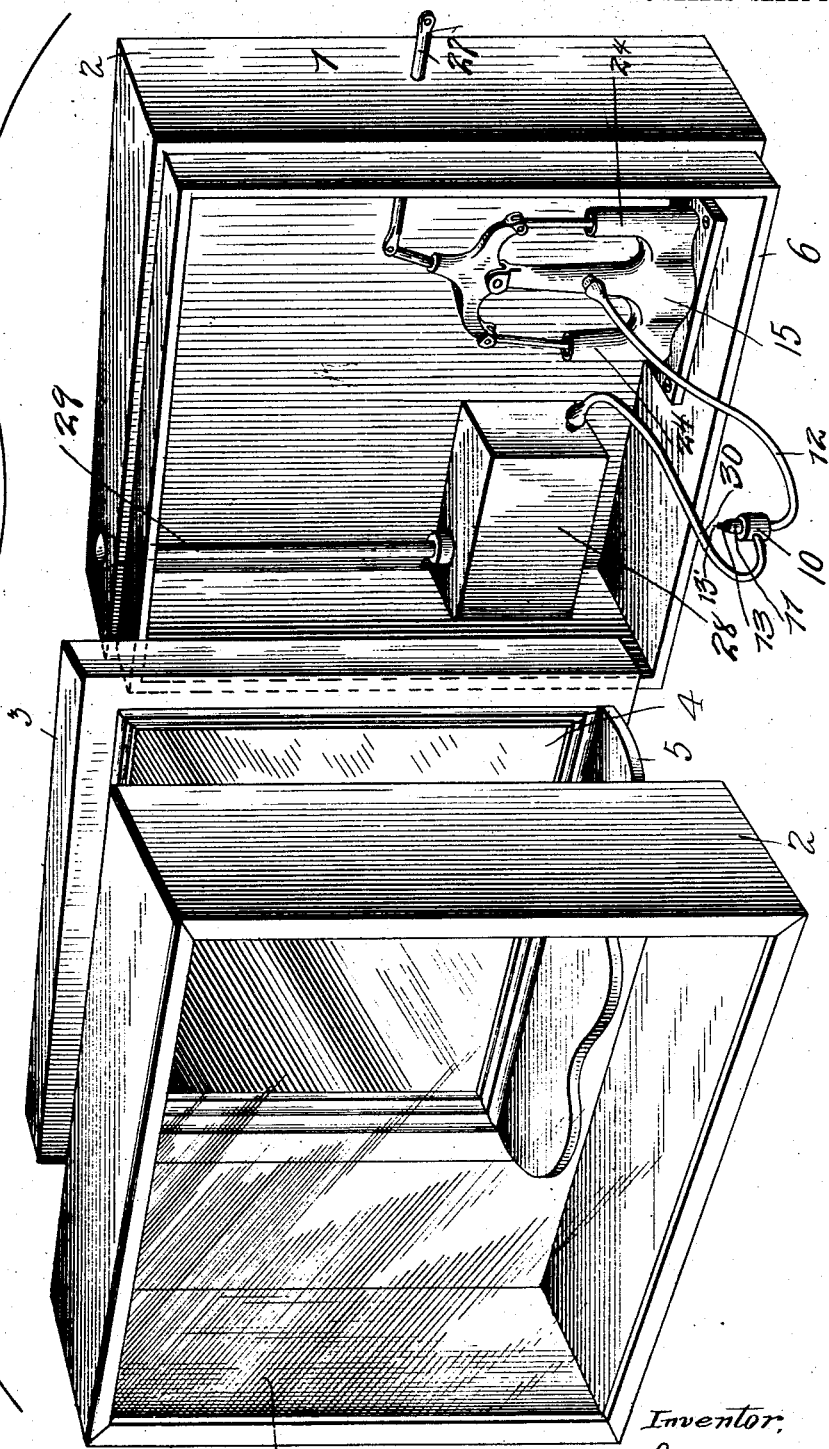

No. 842,830. PATENTED JAN. 29, 1907.
W. C. DUNN.
DEVICE FOR ADVERTISING EFFERVESCENT LIQUIDS.
APPLICATION FILED NOV. 3, 1905.
3 SHEETS—SHEET 3.
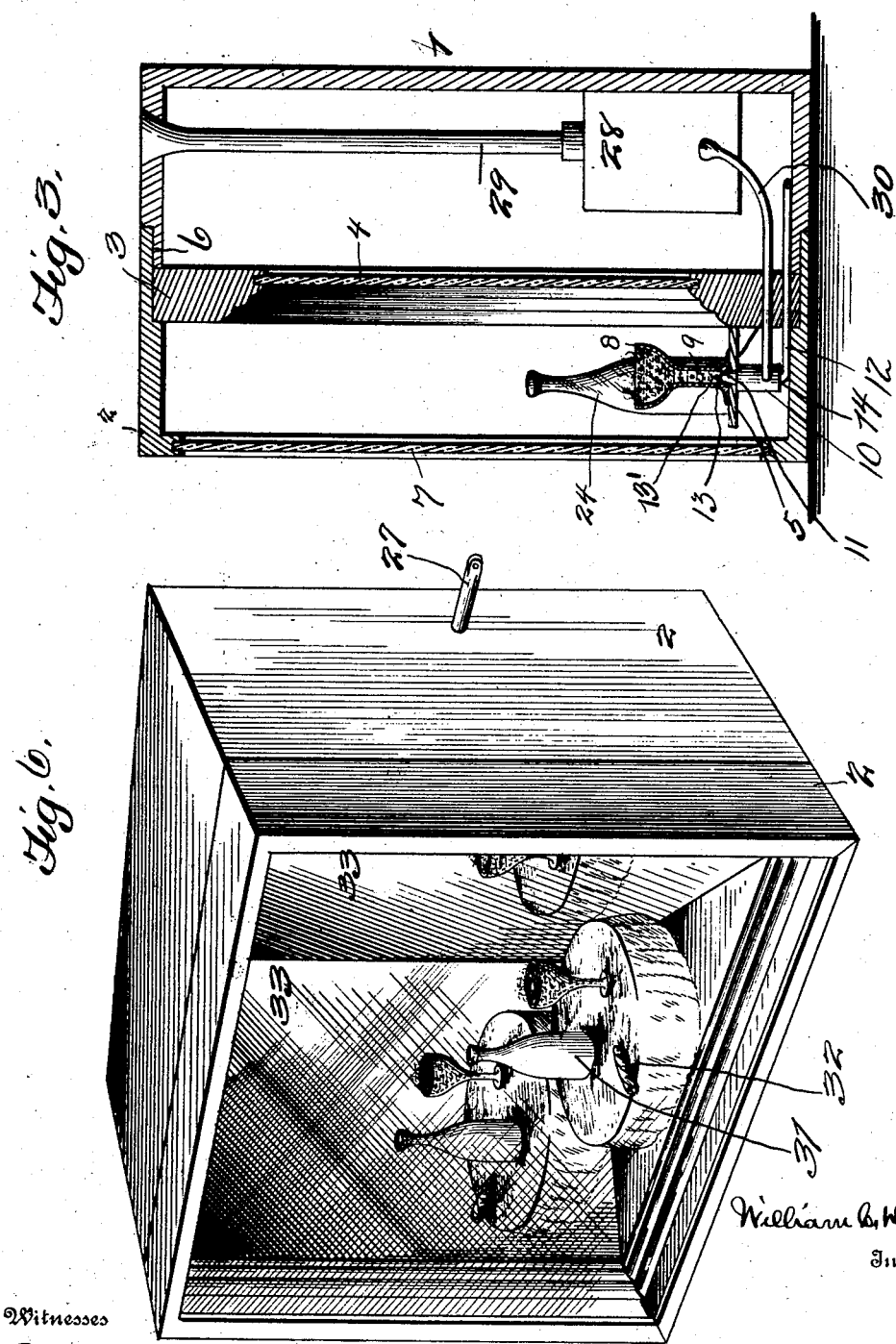

UNITED STATES PATENT OFFICE.

WILLIAM C. DUNN, OF BROOKLYN, NEW YORK.

DEVICE FOR ADVERTISING EFFERVESCENT LIQUIDS.

No. 842,830.     Specification of Letters Patent.     Patented Jan. 29, 1907.

Application filed November 3, 1905. Serial No. 285,778.

*To all whom it may concern:*

Be it known that I, WILLIAM C. DUNN, a citizen of the United States, and a resident of Brooklyn, in the county of Kings and State of New York, have invented certain new and useful Devices for Advertising Effervescing Liquids, of which the following is a specification.

This invention relates to devices for advertising by means of articles mounted on display-stands.

The object of the invention in the present instance is to advertise a particular brand of effervescing wines or sparkling beverages. This is carried out by means of a display-stand containing a wine-glass or other transparent liquid-receptacle and an apparatus connected with the wine glass or receptacle by means of which liquid is supplied to said wine glass or receptacle and maintained therein in an effervescent state, thereby exposing to public gaze the appearance of a glass filled with an effervescent beverage, all as hereinafter fully set forth and shown.

Referring to the accompanying drawings, Figure 1 is a perspective view of a display-stand constructed and arranged in accordance with my invention. Fig. 2 is a view in perspective of a display-stand having its parts separated and disclosing the apparatus for supplying liquid to a wine glass or other liquid-receptacle and maintaining the liquid therein in an effervescent state. Fig. 3 is a transverse vertical section of the invention on the line 3 3 of Fig. 1. Fig. 4 is a detail enlarged view of the liquid-supply reservoir and its connection. Fig. 5 is a face view of an air-pump, partly in vertical section, which is connected with the wine-glass. Fig. 6 is a perspective view of a modification of the construction of the display-stand.

In carrying out the invention I provide a display-stand 1 of a box shape, and preferably constructed with the two main parts 2 and an intervening frame 3, inclosing a mirror 4 and having a shelf 5, located at the bottom of the mirror. The frame 3 fits over and is supported by a rim or projection 6 on the rear portion 2, and the front portion 2 is slid over the frame 3, supported by the rim 6, and fits tight against the rear portion 2, as shown in Fig. 1. The shelf 5 projects above the bottom of the front portion 2. The frame 3, with its mirror 4, as shown in Fig. 3, separates the display-stand 1 into two parts. The front of the display stand or casing 1 may be closed by a glass 7, as shown. Upon the shelf 5 is mounted a wine-glass 8 or other suitable form of transparent liquid-receptacle—as, for instance, a champagne-bottle. The stem of the glass 8 is hollow, forming a passage-way 9 for the admission of a liquid.

Beneath the shelf 5 is located a liquid-supply reservoir 10, as shown in Fig. 3 and in enlarged form in Fig. 4. The upper portion of the liquid-supply reservoir 10 is formed with a projection 11, which projects up through a hole in shelf 5 and into the lower end of passage-way 9 and serves as a stopper. The projection 11, which is made of rubber, is provided with a tubular passage-way 11', which communicates with the passage-way 9 and permits the passage of liquid from reservoir 10 to the glass 8.

12 is a pipe which passes through the liquid-supply reservoir 10 and the tubular passage-way 11' and has its end 13 communicating with the passage-way 9 of glass 8. The pipe 12 passes through a hole in the bottom of the reservoir 10 and is made water-tight at the point 14. The pipe 12 connects with an air-pump 15, as shown in Fig. 2. In the end 13 of pipe 12 is inserted a porous cartridge 13', made of any suitable material. The porous cartridge 13' is so fine that while air can be forced through it the liquid in glass 8 cannot escape through it.

The air-pump 15, as shown, is a double-acting air-pump, formed with the cored-out air-chamber 16. Each piston 17 of the air-pump is provided with the conical passage-way 18, inclosing an intake ball-valve 19, held in place in its lower position by a cross-wire 20. The bottom of the piston 17 is provided with a leather washer 21, having a central opening 22 in line with the passage-way 18. The bottom 23 of each cylinder 24 is provided with a conical passage-way 25, connecting the cylinder 24 with the air-chamber 16 and having located therein a ball spring-valve 26, normally closing the passage-way 25. The air-pump 15 is provided with an arm 27, extending through the side of the rear portion 2 of the casing, and may be connected with a suitable handle to be run by hand. The air-pump may be operated by a spring or electric motor, which in such case is concealed in the back of the casing adjacent to the pump.

28 is a liquid-supply tank mounted on the rear wall of the casing and provided with the vertical pipe 29, by means of which liquid may be supplied to the tank 28. The tank 28 is connected with the liquid-supply reservoir 10 by means of a pipe 30.

The operation of the device is as follows: Any suitable colored liquid is poured into the tank 28 through the tube 29, which runs through the pipe 30 to the reservoir 10, and, as water always seeks its own level, after reservoir 10 is full the liquid rises and passes around pipe 12, through the passage-way 11' in projection 11 and passage-way 9, into the glass 8. Only enough liquid is poured into the tank 28 to maintain the required level of the liquid in glass 8.

The object of the liquid-supply tank 28 is to easily replace loss by evaporation therein, the tank 28 holding many times the amount of liquid held by glass 8. The reason reservoir 10 is used is because the opening in the bottom of the passage-way 9 must of necessity be very small in a wine-glass, and it would be difficult to have both pipe 30 and pipe 12 connect directly therewith, especially as it is necessary in order to get the proper effect to have pipe 12 discharge the air through the porous cartridge 13' directly in the center and in line with the hollow stem of the glass.

Air under pressure is forced through the pipe 12 and the porous cartridge 13' into the liquid in the glass.

With the downward movement of the piston 17 in either cylinder 24 valve 26 is forced open and allows the air to enter the air-chamber 16, and on the upward motion valve 26 closes, preventing the air from escaping from chamber 16, and fresh air is admitted into cylinder 24 through the passage-way 18 of intake-valve 19, which opens on the upward movement of piston 17 and closes on its downward movement. This allows the air to be compressed in the chamber 16, so as to get the steady flow required instead of an intermittent or pulsating flow. If desired, other gas may be used in pump 15 instead of air; but air is preferably used. The pressure obtained is just sufficient to force the air through the cartridge 13' at the end of pipe 12 into the colored liquid in the glass 8. In being forced through this cartridge the air is broken up into very minute globules and gives the exact representation of the gas or bubbles in a glass of sparkling champagne.

In order to carry out the advertising feature, there may be displayed on the shelf 5 different articles, such as a champagne-bottle 31 and cigar 32. These several articles being reflected in the mirror 4 add to the advertising feature, and the liquid effervesces continually in the glass 8.

Various arrangements of the bottle, glass, and other articles can be made—as, for example, as shown in Fig. 6, where inclined mirrors 33 are mounted in the casing 1, thereby multiplying the articles displayed in the front of the casing.

What I claim is—

1. A device for advertising an effervescent liquid, consisting of a display-stand, a transparent liquid-receptacle, a combined air and liquid supply, connected with the receptacle, whereby the normal level of the liquid is maintained in the receptacle, and means for producing an effervescent appearance of the liquid in the receptacle.

2. A device for advertising an effervescing liquid, consisting of a transparent liquid-receptacle, in combination with a liquid-supply reservoir connected with said liquid-receptacle, a liquid-supply tank, connected with said liquid-supply reservoir, an air-pump connected with the liquid-supply reservoir, and the liquid-receptacle; and a porous cartridge located in the connection between the liquid-supply reservoir, and the liquid-receptacle, as and for the purpose set forth.

3. A device for advertising an effervescing liquid, consisting of a transparent liquid-receptacle, having an opening in its lower portion, and an air, and liquid supply connection with said opening, having a porous cartridge; in combination with a liquid-supply reservoir, connected with said liquid-receptacle, a liquid-supply tank, connected with said liquid-supply reservoir, and an air-pump, connected with said liquid-supply reservoir, substantially as shown and described.

4. In a device for advertising an effervescent liquid, a transparent liquid-receptacle, having an opening in its lower portion, in combination with a liquid-supply reservoir, and an air-pump, connected with said opening in the liquid-receptacle, and a liquid-supply tank connected with said liquid-supply reservoir, whereby liquid may be supplied to said liquid-receptacle in an effervescing condition, and maintained in such state, substantially as herein set forth.

5. A device for advertising an effervescing liquid, consisting of a show-case, provided with mirrors, and a shelf on which is displayed a wine-glass, a bottle and other articles; said wine-glass having a passage-way for liquid in its stem; in combination with a liquid-supply reservoir, having a connection with the stem of the wine-glass for the passage of air and liquid, and a porous cartridge in such connection; an air-pump having a tubular connection with said liquid-supply reservoir, and terminating adjacent to the cartridge; and a liquid-supply tank, connecting with the liquid-supply reservoir, as and for the purpose set forth.

Signed at New York city, in the county of New York and State of New York, this 23d day of October, A. D. 1905.

WILLIAM C. DUNN.

Witnesses:
    WM. BONDY,
    CHARLES L. LIVINGSTON.